United States Patent [19]

Simcock

[11] Patent Number: 5,349,167
[45] Date of Patent: Sep. 20, 1994

[54] INDUCTION HEATING APPARATUS WITH PWM MULTIPLE ZONE HEATING CONTROL

[75] Inventor: John H. Simcock, Worcestershire, Great Britain

[73] Assignee: Indecctotherm Europe Limited, Hereford, United Kingdom

[21] Appl. No.: 102,073

[22] Filed: Aug. 2, 1993

[30] Foreign Application Priority Data

Aug. 6, 1992 [GB] United Kingdom ............... 9216709.7

[51] Int. Cl.$^5$ ................................................ H05B 6/08
[52] U.S. Cl. .................................... 219/662; 219/667; 219/656
[58] Field of Search ............... 219/10.77, 10.71, 10.79, 219/10.75, 662, 664, 667, 677, 656

[56] References Cited

U.S. PATENT DOCUMENTS

| | | | |
|---|---|---|---|
| 3,740,859 | 6/1973 | Patton et al. | 219/10.77 |
| 3,823,362 | 7/1974 | Bailey | 219/10.77 |
| 4,280,038 | 7/1981 | Havas | 219/10.77 |
| 4,307,276 | 12/1981 | Kurata et al. | 219/10.77 |
| 4,506,131 | 3/1985 | Beohm et al. | 219/10.71 |
| 4,626,978 | 12/1986 | Thouvenin | 219/10.77 |
| 4,845,332 | 7/1989 | Jancosek et al. | 219/10.71 |
| 5,023,430 | 6/1991 | Brekkestran et al. | 219/486 |
| 5,023,705 | 7/1991 | Batcheller et al. | 219/211 |
| 5,059,762 | 10/1991 | Simcock | 219/10.77 |

FOREIGN PATENT DOCUMENTS

| | | |
|---|---|---|
| 0426350 | 5/1991 | European Pat. Off. |
| 2130761 | 6/1984 | United Kingdom |
| 2239964 | 7/1991 | United Kingdom |

Primary Examiner—Philip H. Leung
Attorney, Agent, or Firm—Seidel, Gonda, Lavorgna & Monaco

[57] ABSTRACT

Figure 1:
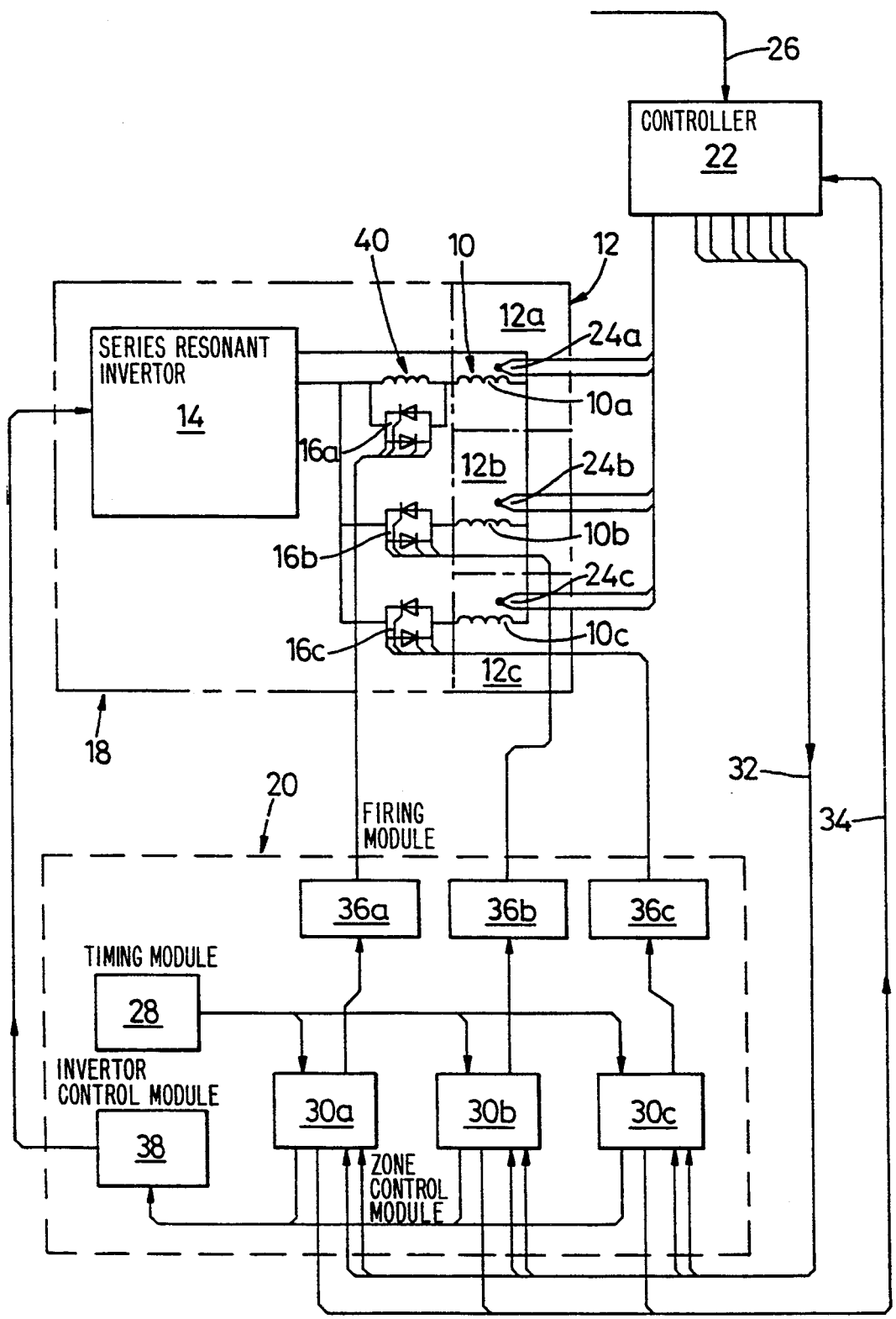

Induction heating apparatus, typically for metal melting, with multiple zone temperature control has an induction coil (10) divided into individual sections (10a, b, c) associated with respective zones and powered in parallel under regulation from controller (20) as shown in FIG. 1. To give precise and efficient automatic regulation of the zone temperatures the power supply is provided by a resonant invertor (14) as a medium frequency pulsed output and at an instantaneously selected level which is the sum of the power requirements of all the zones at any instant, and the average power applied in each zone is controlled by pulse width modulation with switching to high power for a proportion, determined by demand in that zone, of each of successive standard time periods.

8 Claims, 5 Drawing Sheets

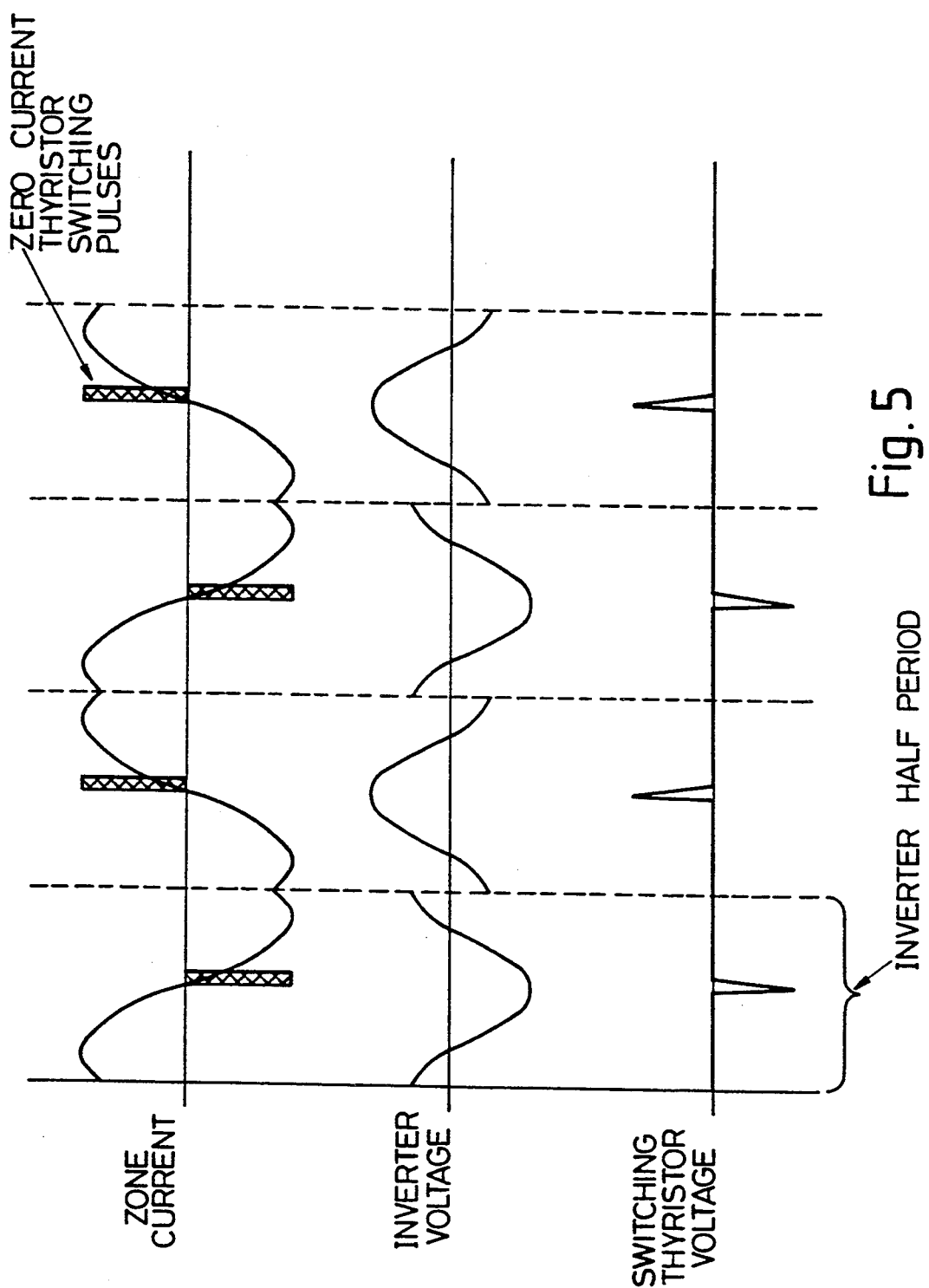

INDUCTION HEATING APPARATUS WITH PWM MULTIPLE ZONE HEATING CONTROL

This invention relates to induction heating apparatus, for example for induction melting of metals and metal alloys.

In some applications it is desirable that the operating temperature of the melt or other workload is under close control and is maintained accurately at predetermined levels in respective zones of the load operated on by respective sections of the induction heating means.

Known induction heating apparatus having this multiple zone control feature is described in our EP-A-0426350.

The object of the present invention is to provide apparatus of the aforementioned type having particularly efficient, responsive, and precise automatic regulation of the zone temperatures, which is simple and reliable in construction and operation, and which makes effective and closely controlled use of energy with minimum wastage.

According to the invention there is provided induction heating apparatus including induction coil means operatively associated with a melt or other workload to be heated, said coil means being divided into a plurality of defined sections each associated with a respective zone of the workload in use; power supply means for providing power input to said coil means with each said section being supplied in parallel; and control means for regulating the power applied to each said section for automatic regulation of the operating temperature in the respective associated zone: characterised in that the power supply means is a resonant invertor operating to provide a medium frequency pulsed power output to the coil means at an instantaneously selected level which is the sum of the power requirements for all said zones at any instant of time; and in that the control means includes means operating to control the average power applied in each zone by pulse width modulation, said means switching from a nil or low power level to a high power level for a proportion of each of successive standard time periods, said proportion being determined by the power requirement in that zone as a function of its temperature.

The term "medium frequency" is used to comprise frequencies from around 50 hz (standard U.K. A.C. mains frequency) upto around 10 Khz.

Preferably the invertor is a series resonant invertor. As this will require a continuous output loading, albeit at a low level, to keep it in operation ready for instantaneous response, the circuit of one of the coil sections may include a series reactor bridging the high power switch of that section, i.e. there will be a low power state having a positive value for that section or zone, whereas the low power state of the remaining sections or zones will be zero.

It is also preferred that the timing of switching of the sections or zones to their respective high power levels is staggered so that changes in the total demanded power level are made in minimum increments at any given instant.

Figure 2:
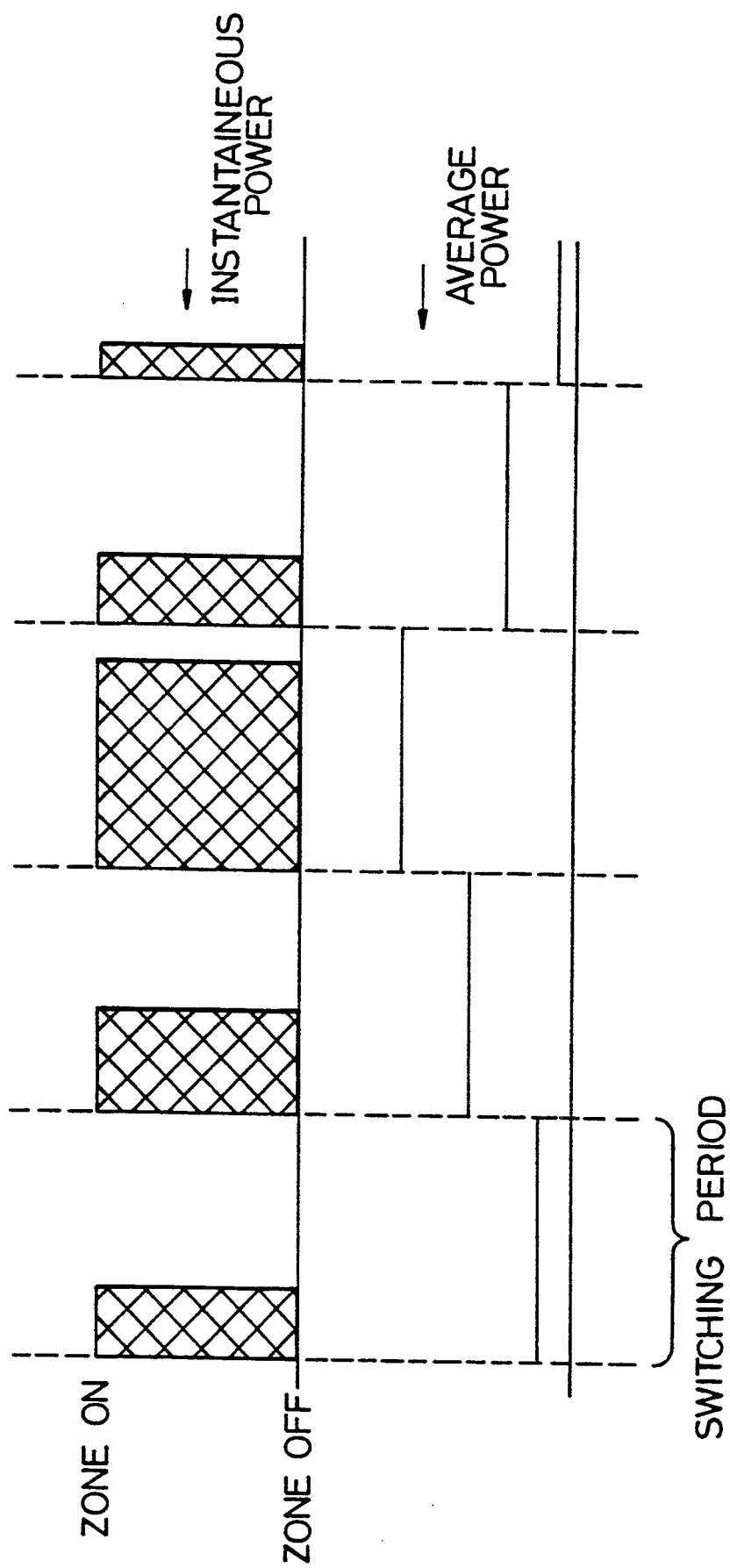
Figure 3:
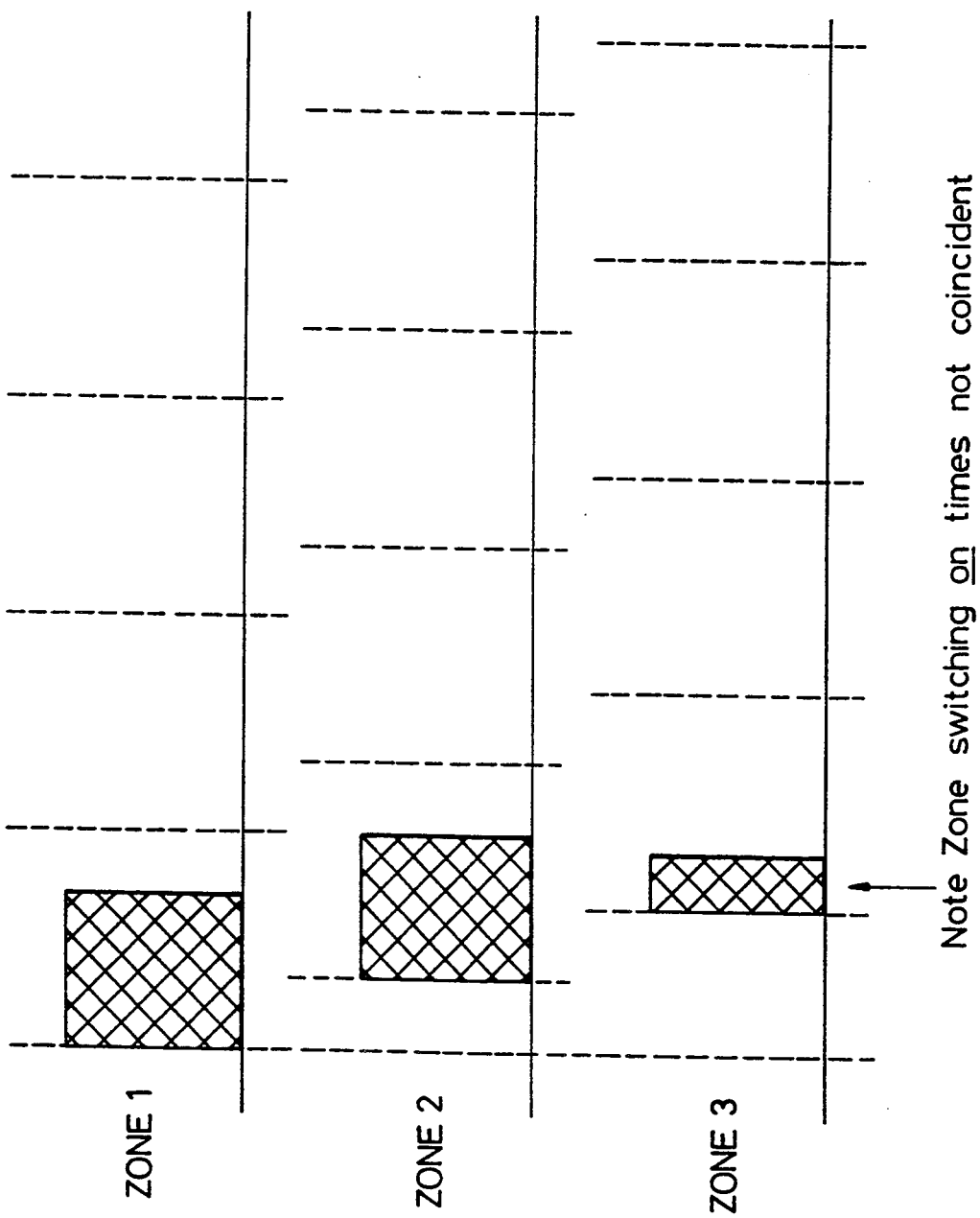
Figure 4:
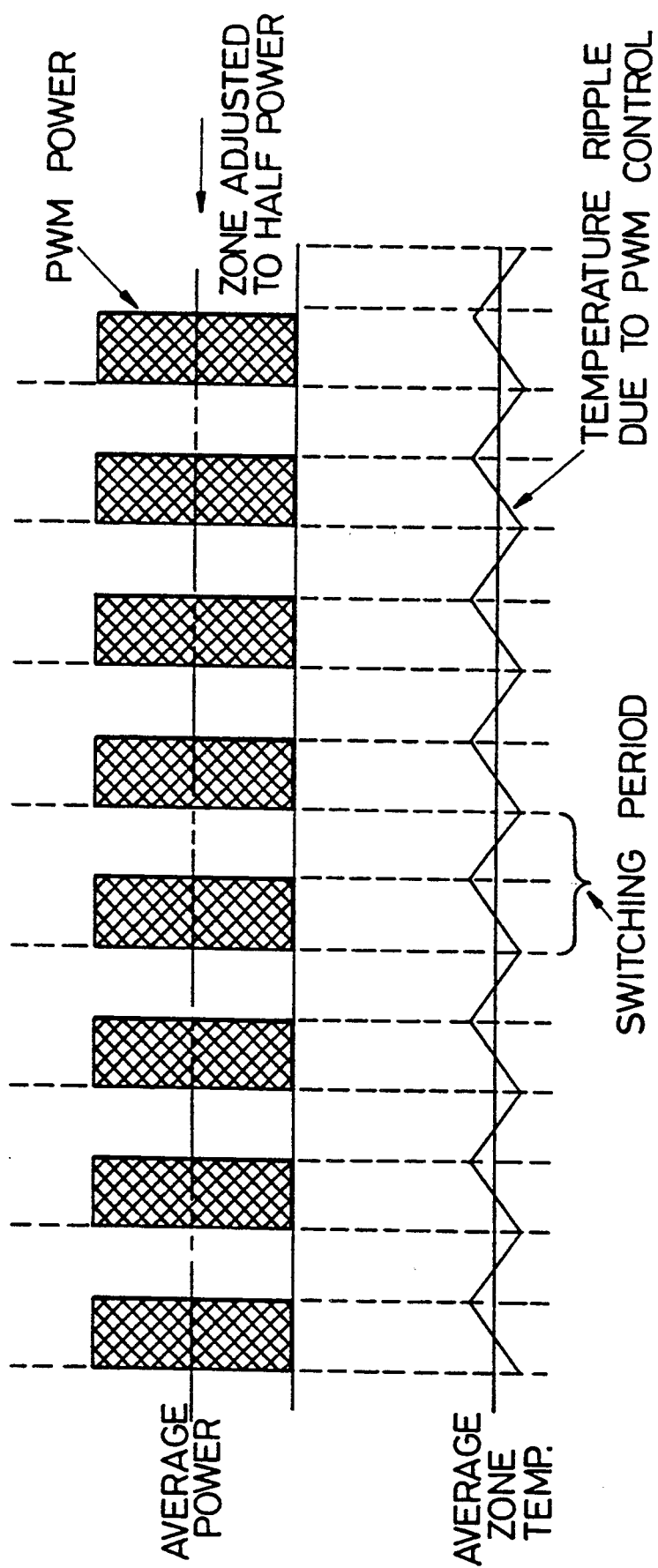

An example of the invention is now more particularly described with reference to the accompanying drawings wherein:

FIG. 1 is a diagrammatic representation of induction heating apparatus,

FIG. 2 is a graphic diagram illustrating application of pulse width modulation to control average zone power, FIG. 3 is a graphic diagram illustrating staggered switching of power to multiple zones, FIG. 4 is a graphic diagram further illustrating pulse width modulation control of average temperature, and FIG. 5 is a graphic diagram of current and voltage wave forms and relating switching pulses in operation of the apparatus.

The induction heating apparatus for melting metals includes an induction coil 10 operatively associated with the workload (not shown) e.g. a melt of alloy or other metal contained in a suitable vessel 12 in known manner.

In this example coil 10 is divided into three equal sections 10a, b and c, each section being associated with a respective zone 12a, b and c of the workload containing vessel 12.

It is to be understood that any number of coil sections from two upwards could be provided, also that for some applications said sections could be unequal in size and/or have other differing characteristics.

The sections of coil 10 are connected in parallel with each other to a common power source in the form of a medium frequency series resonant invertor 14 through respective thyristor switches 16a, b and c, said switches and power source forming parts of a power supply section 18.

Operation of invertor 14 and the switches 16 of the coil sections is controlled automatically by power control means 20 regulated in turn by an automatic process controller 22.

The operating temperature in each of the zones 12 is measured by respective temperature sensing means connected to controller 22, in this example thermo-couples 24a, b and c in the respective zones though other sensing means such as optical pyrometers could be used. Controller 22 incorporates proportional, integral and differential interfacing through the power control section 20 for operation of the section switches 16, the desired process temperature level being preset or adjusted by input 26 to controller 22.

The power applied from source 14 to each section of coil 10 to achieve the desired zone temperature is regulated by pulse width modulation, the control means 20 commanding invertor 14 to supply the precise and instantaneous total power output required at any instant depending on the switching state (on or off) of the thyristor switches 16.

In apparatus such as the present example having three identical zones 12 any one of four power levels will be required at any given time i.e. nil or minimum level when none of the coil sections 10 are switched on, a maximum level when all three sections are switched on, and a lower and a higher intermediate level when any one or any two of the sections are switched on.

The power applied in each zone is controlled on a pulse width modulation basis using a repetitive pulse interval derived from a timing module 28 of control section 20 providing a switching period control for each of the sections. The duration of the pulse interval determining the switching period is selected to be short compared with the thermal time constant of the workload being heated so that the application of pulse width modulation causes only very short term temperature variations or ripple as illustrated diagrammatically by FIG. 4.

Control means 20 further includes a zone control module 30a, b and c respective to each section of coil 12, each connected to the timing module 23 and also provided with connection 32 for receiving respective command signals from process controller 22. There are also feedback connections 34 to the latter controller.

Output from each module 30 passes through a respective thyristor firing module 36a, b and c for individual actuation of the thyristor switches 16.

The control modules 30 are also connected to an invertor control module 38 of control means 20 which in turn regulates the operation of the invertor 14 as referred to above.

The series resonant invertor 14 requires an active minimum power state to keep it operational for instant response and this is provided by means of a series reactor 40 connected across the thyristor switch 16a in connection with coil section 12a, thus power at a very low level flows through the latter section only even when all the coil sections are otherwise inoperative. This provision is not necessary for the other coil sections whose minimum power level will be nil. The inductance of reactor 40 is selected to be some four times that of coil section 12a so that when both of the other coil sections 12b, 12c are switched on to full power the section 12a minimum power is low by comparison.

The switch 16a of coil section 12a having the series reactor 40 incorporates zero current crossover gating; the other sections which have nil low power state incorporate asynchronous gating of their respective thyristor switches.

To minimise the size of the steps in which changes in demanded power are applied to the invertor 14 the times at which the respective switches of each section are turned on are staggered as shown diagrammatically in FIG. 3. By spacing the switch-on time of each section incrementally by sub-divisions of the standard time period (one third sub-divisions in FIG. 3) it is ensured that only one section is switched on at any one time. It may be that more than one section will switch off simultaneously, though it is preferable that this does not happen it can be tolerated.

Automatic control of the operating temperature in each individual zone 12 is therefore achieved by controlling the average power in each zone by varying the time in which the respective thyristor switches 16 are switched on during each standard switching period. Use of pulse width modulation achieves optimum efficiency in that the switching arrangement needs to provide only two power levels, high and low (minimum or zero) in each zone for minimum losses. Due to the practically instantaneous response very precise power control in the multiple zones is achieved using a single power source and with very efficient utilization of energy. The response is very swift, it is contemplated that it may take place within a single cycle of invertor frequency, and it is believed that the operating temperature may be controlled using the invention with an accuracy of 1 deg. C. in 1000 degs. C.

FIG. 5 illustrates diagrammatically the zone current wave form lagging approximately 90 deg. on the zone voltage wave form so that there is always a substantial invertor voltage available at zero zone current crossover to cause the switching thyristors to conduct. It also shows the switching thyristor voltage wave form. The peak thyristor voltage at zero current crossover depends on the instantaneous invertor voltage at that instant in time.

While use of a series resonant invertor 14 is preferred it is also contemplated that a parallel resonant invertor might be used, if so the loading reactor 40 could be dispensed with.

I claim:

1. Induction heating apparatus including induction coil means operatively associated with a melt or other workload to be heated, said coil means being divided into a plurality of defined sections each associated with a respective zone of the workload in use; single power supply means for providing power input to said coil means with each said section being supplied in parallel; and control means for regulating the power applied to each said section for automatic regulation of the operating temperature in the respective associated zone: characterised in that the power supply means is a series resonant invertor operating to provide a medium frequency from approximately 50 Hz to approximately 10 kHz pulsed power output to the coil means at an instantaneously selected level which is the sum of the power requirements for all said zones at any instant of time; and in that the control means includes means operating to control the average power applied in each zone by pulse width modulation, said means switching from a nil or low power level to a high power level for a proportion of each successive preselected time periods, said proportion being determined by the power requirement in that zone as a function of its temperature.

2. An apparatus according to claim 1 wherein the circuit of one of the coil sections includes a series reactor bridging the high power switch of that section to provide a low power position value state thereof for continuous low level output loading of said series reactor in use.

3. An apparatus according to claim 1 wherein the timing of switching of the sections to their respective high power levels is staggered in use.

4. An apparatus according to claim 1 wherein the control means includes a thyristor switch respective to each section for effecting said high power switching.

5. An apparatus according to claim 4 wherein each thyristor switch has a respective thyristor firing module and associated zone control module, each of the latter being connected to the time module.

6. An apparatus according to claim 1 wherein the control section includes a timing module providing a repetitive pulse interval for switch period control of each said section.

7. An apparatus according to claim 1 wherein the sections into which the coil means is divided are equal in size.

8. An apparatus according to claim 1 wherein the coil means is divided into three sections.

* * * * *

UNITED STATES PATENT AND TRADEMARK OFFICE
CERTIFICATE OF CORRECTION

PATENT NO. : 5,349,167
DATED : September 20, 1994
INVENTOR(S) : John H. Simcock

It is certified that error appears in the above-indentified patent and that said Letters Patent is hereby corrected as shown below:

Title page, item [75], change "Great Britain" to --United Kingdom --.
[73], change "Hereford" to --Worcestershire--.

Signed and Sealed this

Twenty-fourth Day of January, 1995

Attest:

BRUCE LEHMAN

Attesting Officer     Commissioner of Patents and Trademarks